United States Patent
Matsuda

(10) Patent No.: US 6,209,432 B1
(45) Date of Patent: Apr. 3, 2001

(54) METHOD AND APPARATUS FOR CUTTING WIRE

(75) Inventor: Isamu Matsuda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 08/927,813

(22) Filed: Sep. 11, 1997

(30) Foreign Application Priority Data

Sep. 12, 1996 (JP) .................................................... 8-241629

(51) Int. Cl.⁷ ........................................................ B26D 1/56
(52) U.S. Cl. ............................. 83/342; 83/349; 83/356.3; 83/566; 83/950; 241/242
(58) Field of Search ................. 83/37, 342, 349, 83/356.3, 436.3, 566, 950, 331; 241/242

(56) References Cited

U.S. PATENT DOCUMENTS

| | | | | |
|---|---|---|---|---|
| 3,359,843 | * | 12/1967 | Mead ...................................... | 83/349 |
| 3,760,673 | * | 9/1973 | Peterson, Jr. ........................... | 83/349 |
| 4,114,491 | * | 9/1978 | Hashimoto et al. .................... | 83/341 |
| 4,226,372 | * | 10/1980 | Wigand .................................. | 241/34 |
| 4,422,358 | * | 12/1983 | Hull et al. ............................ | 83/356.3 |
| 4,664,006 | * | 5/1987 | Mitchell ............................ | 241/242 X |
| 4,960,020 | * | 10/1990 | Reinhard ............................. | 83/349 X |
| 4,969,605 | * | 11/1990 | Morin ................................ | 241/242 X |
| 5,001,952 | * | 3/1991 | Myogadani ............................. | 83/342 |
| 5,454,523 | * | 10/1995 | Matsuda .............................. | 241/242 |
| 5,483,729 | * | 1/1996 | Fayard ............................... | 83/349 X |
| 5,523,538 | * | 6/1996 | Matsuda ............................. | 219/69.12 |
| 5,690,009 | * | 11/1997 | Nakao et al. ....................... | 83/349 X |

FOREIGN PATENT DOCUMENTS 6-297230    10/1994   (JP) .

OTHER PUBLICATIONS

Patent Abstract of Japan, M–262, 1983, vol. 7/No. 279, 58–155116.
Patent Abstract of Japan, CD–ROM, JP 06297230 A.

* cited by examiner

*Primary Examiner*—M. Rachuba
(74) *Attorney, Agent, or Firm*—Armstrong, Westerman, Hattori, McLeland, & Naughton, LLP

(57) ABSTRACT

A fixed blade and a rotary cutter are mounted in a supporting frame of a wire cutting apparatus. A clearance not larger than a half of a diameter of the wire is provided between a tip of the fixed blade and a tip of the rotary cutter. The rotary cutter has a channel provided between each couple of cutting edges of the rotary cutter and inclined to its rotational shaft. The fixed blade may be disposed in each of opposing side walls of the supporting frame, the fixed blades being shifted from each other in an axial direction of the rotational shaft.

8 Claims, 6 Drawing Sheets

METHOD AND APPARATUS FOR CUTTING WIRE

FIELD OF THE INVENTION

This invention relates to a method and an apparatus for cutting a wire (or such continuous elements) into short strips. Particularly, the wire is such one used for a wire electrode in an electric spark machine or an electric wire.

BACKGROUND OF THE INVENTION

Referring to FIGS. 9 and 10, there is illustrated a known wire cutting apparatus for cutting such a wire as an electrode used in an electric spark machine, which has been disclosed in Japanese Patent Application Laid-open No. H. 6-297230.

This wire cutting apparatus includes a motor M, a rotary cutter mounting base b and a fixed blade fitting plate c, which are disposed on frame a of the apparatus. The motor M rotates a rotary cutter d mounted on the base b. Thereby, a wire (continuous elements) W is cut by both a cutting edge $e_1$ of a fixed blade e mounted in the plate c and a plurality of cutting edges $d_1$ of the rotary cutter d.

However, it generates an undesirable vibration and a very annoying noise that the edges $d_1$ of the rotary cutter d makes contact with the edge $e_1$ of the fixed blade e when the wire W is cut. Moreover, this causes rapid wears in the edges $d_1$ and $e_1$. In addition, the contact of the edges $d_1$ and $e_1$ makes a shaft bearing of the rotary cutter d wear away quickly, causing a gap in the shaft bearing to produce a bigger vibration and noise. Thus, the known apparatus has such disadvantages.

In such known cutting apparatus, the cutting edge $e_1$ of the fixed blade e contacts with the edge $d_1$ of the rotary cutter d in the cutting operation. Being mutually contacted, the wire W may not be cut completely but may be bent at the cutting edge $e_1$ of the fixed blade e. Thus, the operation may not accomplish smooth continuous cutting of the wire.

SUMMARY OF THE INVENTION

In view of the above-mentioned disadvantages, an object of the present invention is to provide a method and an apparatus for cutting a wire, which generates a reduced vibration and noise, improve cutting operation in productivity rate and in durability.

For achieving the object, in a first configuration of the invention,
a method for cutting wire includes the steps of:
  mounting a fixed blade and a rotary cutter in a supporting frame; and rotating the rotary cutter to cut a wire conducted between the fixed blade and the rotary cutter,
  wherein a clearance not larger than a half of a diameter of the wire is provided between a tip of the fixed blade and a tip of the rotary cutter.

In a second configuration of the invention, an apparatus for cutting a wire includes:
  a fixed blade having a wire feeding passage and a cutting edge provided at an inner open end of said wire feeding passage;
  a rotary cutter having a plurality of cutting edges at a periphery thereof, and
  a supporting frame for mounting said fixed blade and said rotary cutter,
  wherein a rotational shaft of the rotary cutter is substantially perpendicular to an axis of the wire feeding passage, and a clearance not larger than a half of a diameter of the wire is provided between a tip of the fixed blade and a tip of the rotary cutter.

Preferably, each of the cutting edges of the rotary cutter may extend in a spiral around the rotational shaft.

Advantageously, the cutting edge of the fixed blade is formed at a periphery of a reduced diameter through-hole provided in a leading end of the wire feeding passage.

Preferably, the rotary cutter may have a channel provided between each couple of cutting edges of the rotary cutter and inclined to the rotational shaft.

Advantageously, the wire feeding passages with the fixed blade may be disposed in each of opposing side walls of the supporting frame, the wire feeding passages being shifted from each other in an axial direction of the rotational shaft.

Preferably, the supporting frame may be a frame molded in a body by metal extrusion molding.

Advantageously, the supporting frame may be manufactured by cutting up a square cylindrical body formed by extrusion molding of an aluminum alloy.

In the present invention, the clearance between the opposed edges of the fixed blade and the rotary cutter is determined to be not more than a half of the diameter of the wire, thereby reducing vibration and noise of the apparatus and allowing normal continuous cutting of the wire without undesirable bending of the wire during the cutting operation.

When the minimum clearance of the opposed cutting edges becomes larger than a half of the wire diameter, the wire tends to be bent in cutting operation, interrupting the normal continuous cutting.

More advantageously, the minimum clearance between the opposed edges is determined to be within one-tenth to three-tenths of the wire diameter. That is, the minimum clearance of one-tenth to three-tenths of the wire diameter allows a reduced wear of the cutting edges, improving their durability to enable a more efficient cutting operation of the wire.

In addition, the supporting frame for mounting the fixed blade and the rotary cutter is manufactured by metal extrusion molding, preferably the metal being an aluminum alloy. Thus manufactured frame is useful for accomplishing a minute clearance between the opposing cutting edges easily and for keeping the clearance at the determined value.

Without mutual contact of the opposing cutting edges, the present invention can greatly decrease the vibration and noise generated by the edges, achieving a high speed cutting operation. Further, both the opposing edges can have a longer life-time, decreasing the interruption of the cutting operation for replacement of the fixed blade and the rotary blades, resulted in an improved operating rate of the cutting apparatus.

The cutting edge of the rotary cutter that is configured in a spiral around the rotation axis allows a smooth cutting operation to reduce vibration and noise and improves the operation in productivity. In addition, the cutting edge of the fixed blade is formed all over the end periphery of the reduced diameter through-hole, allowing to make use of the whole periphery of the cutting edge without replacement of the fixed blade, resulted in an increased life-time of the fixed blade.

BRIEF DESCRIPTION OF THE DRAWINGS

FIG. 6A is the front view of the rotary cutter, and FIG. 6B is a side view of the same;

DETAILED DESCRIPTION OF PREFERRED EMBODIMENTS

Referring the accompanied drawings, an embodiment of the present invention will be discussed hereinafter.

Figure 1:
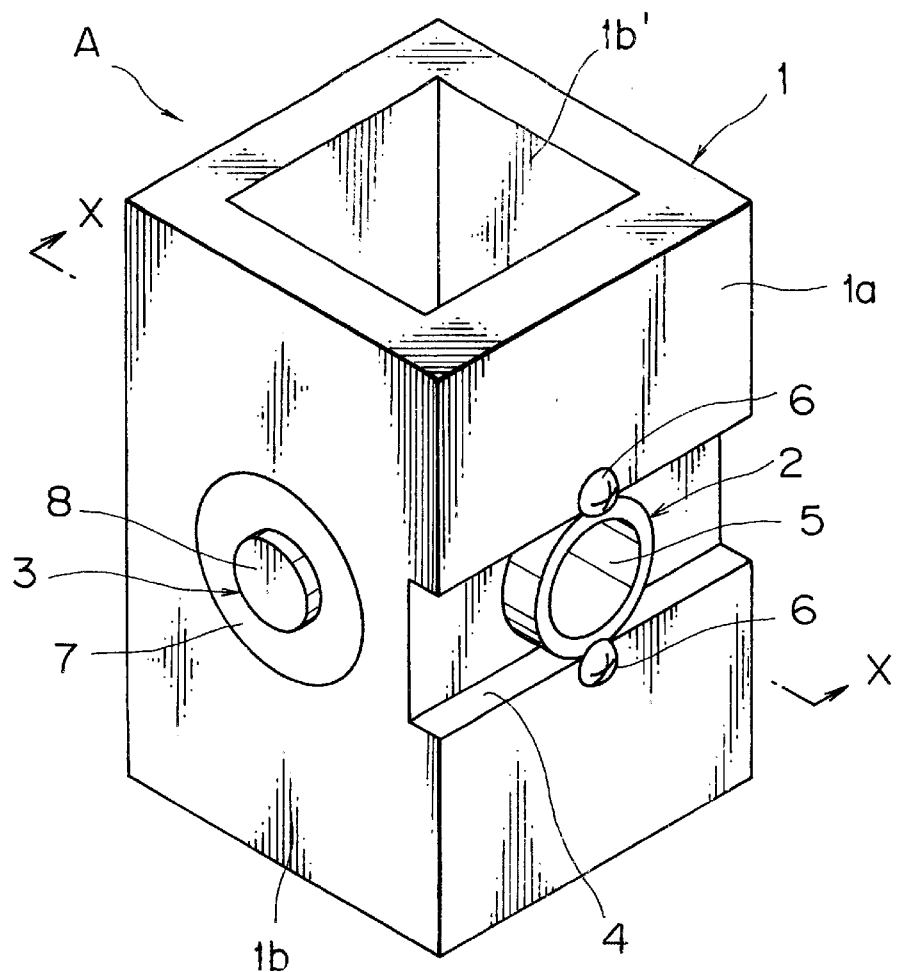
FIG. 1 is a perspective view showing a wire cutting apparatus of an embodiment according to the present invention.
Figure 2:
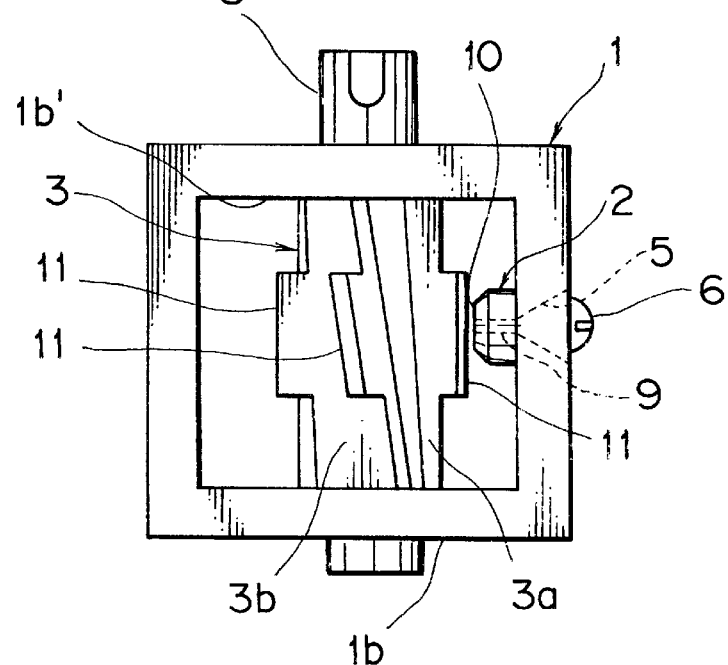
FIG. 2 is a top view of the wire cutting apparatus shown in FIG. 1.
Figure 3:
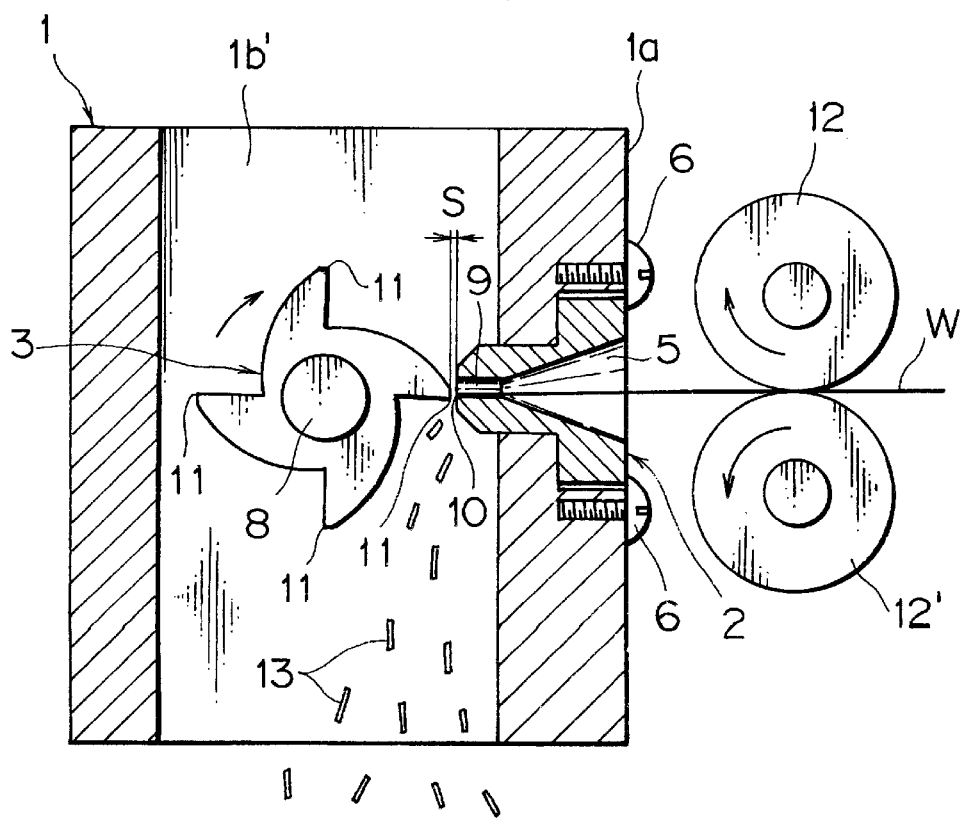
FIG. 3 is a sectional view taken on line X—X of FIG.1.

FIG. 1 is a perspective view showing a wire cutting apparatus of an embodiment according to the present invention; FIG. 2 is a top view thereof; and FIG. 3 is a sectional view taken on line X—X of FIG. 1.

The wire cutting apparatus A includes a supporting frame 1 that is manufactured in a body by aluminum alloy extrusion molding. On the frame are mounted a fixed blade 2 and a rotary cutter 3.

The supporting frame 1 is configured in a cylindrical shape with a rectangular section, in one side wall 1a of which is formed an outer mounting recess 4. The recess 4 has an opening that receives the fixed blade 2 made of a hardened steel. The fixed blade -having a wire feeding passage 5 is secured in the opening of the side wall with a couple of screws 6, the feeding passage being perpendicular to the side wall 1a. Other side walls 1b, 1b, adjacent to the side wall 1a have respectively an opening for inserting and fixing a shaft bearing 7 that axially rotably supports a rotational shaft 8 of the rotary cutter 3.

The fixed blade 2 that is configured in a hopper shape has the feeding passage 5, one end of which is provided with a larger entry opening and the other end of which is provided with a reduced diameter through-hole 9. At an open end periphery of the through-hole 9 is formed a cutting edge 10. The reduced diameter through-hole 9 extends inside the side wall 1a of the frame 1 so as to oppose the cutting edge 10 to the rotary cutter 3.

The rotational shaft 8 of the rotary cutter 3 is rotably supported by the couple of shaft bearings 7 each mounted in the opposing side walls 1b, 1b' of the supporting frame 1. In this arrangement, the central axis of the rotational shaft 8 intersects with the center line of the reduced diameter trough-hole 9 of the fixed blade 2.

The rotary cutter 3 has four cutting edges 11 provided spirally around the rotational shaft, the cutting edges being equally spaced with a channel 3a therebetween. The channel 3a extends at angle to the central axis of the rotational shaft B. Each distance from the center of the rotational shaft 8 to the tip of each cutting edge 11 is the same so that each tip of the edges 11 moves on the same circle. The rotational shaft B is driven by a motor (not illustrated) to rotate at a high speed.

The edge 11 of the rotary cutter 3, when rotating, comes closer to the cutting edge 10 of the fixed blade with a minimum clearance S. The clearance S is predetermined to be not more than a half of the diameter of the wire. The minimum clearance S is predetermined based on the diameter of the wire W. For example, when the wire has a diameter of 0.1 mm, the clearance is preferably predetermined in the range of 0.01 mm to 0.03 mm.

In cutting operation of a wire for an electric spark machine by use of the above-mentioned cutting apparatus A, as illustrated in FIG. 3, a pair of feed rollers 12, 12 for the wire W are disposed adjacent to the feeding passage 5 of the fixed blade 2. Then, the motor (not shown) connected to the rotational shaft 8 of the rotary cutter 3 drives the rotary cutter 3 to rotate it in a direction shown by an arrow.

Figure 4:
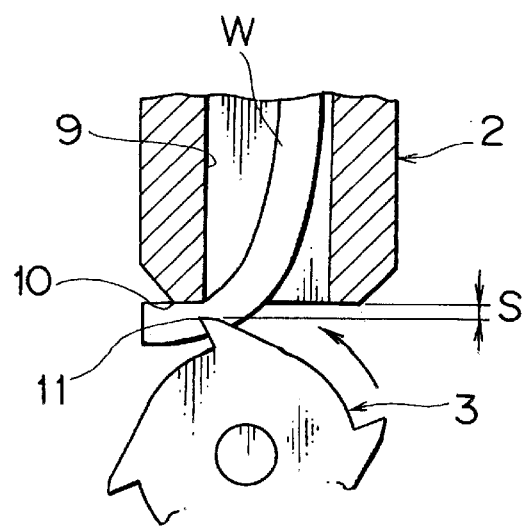
FIG. 4 is an explanatory view illustrating a state that a wire is cutting between the fixed blade and the rotary cutter of FIG. 3.
Figure 5:
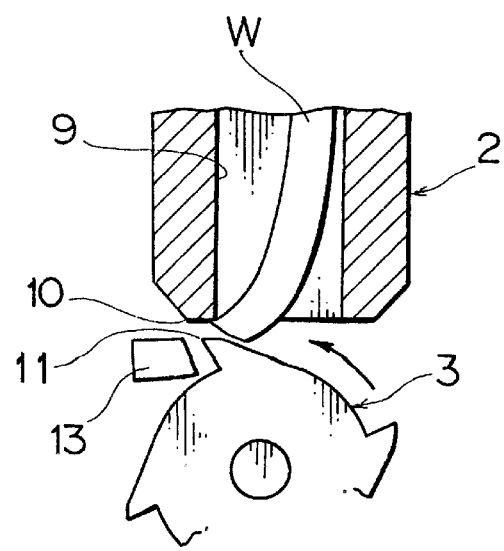
FIG. 5 is an explanatory view illustrating a state that a short strip of the wire of FIG. 4 has been cut away.

The feed rollers 12, 12 turn respectively in a direction shown by an arrow to continuously feed the wire W into the feeding passage 5 of the fixed blade 2. Then, as illustrated in FIG. 4, the wire W advances to extend from the cutting edge 10 of the fixed blade 2. Next, the edge 11 of the rotary cutter 3 rotating in the arrow direction digs into the wire W, thereby moving the wire W to the cutting edge 10 of the fixed blade 2. Thus, as illustrated in FIG. 5, the wire is pressed against the cutting edge 10 of the fixed blade 2 to be cut into short strips.

Figure 6A:
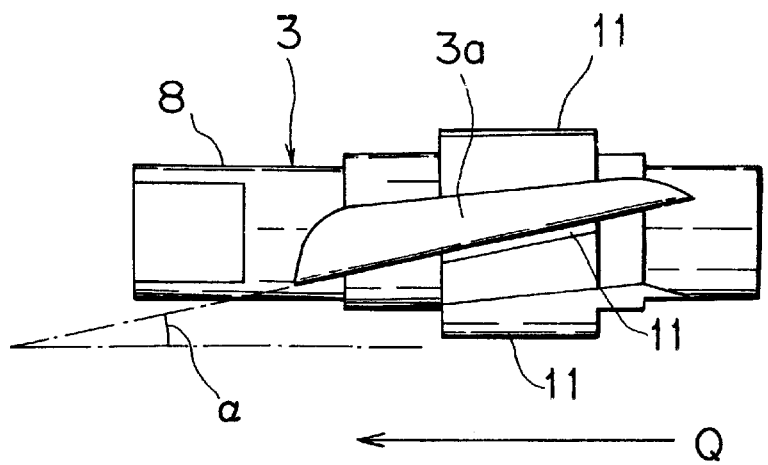
FIGS. 6A, 6B are views for mainly showing a channel formed between cutting edges of the rotary cutter in FIG. 2.
Figure 9:
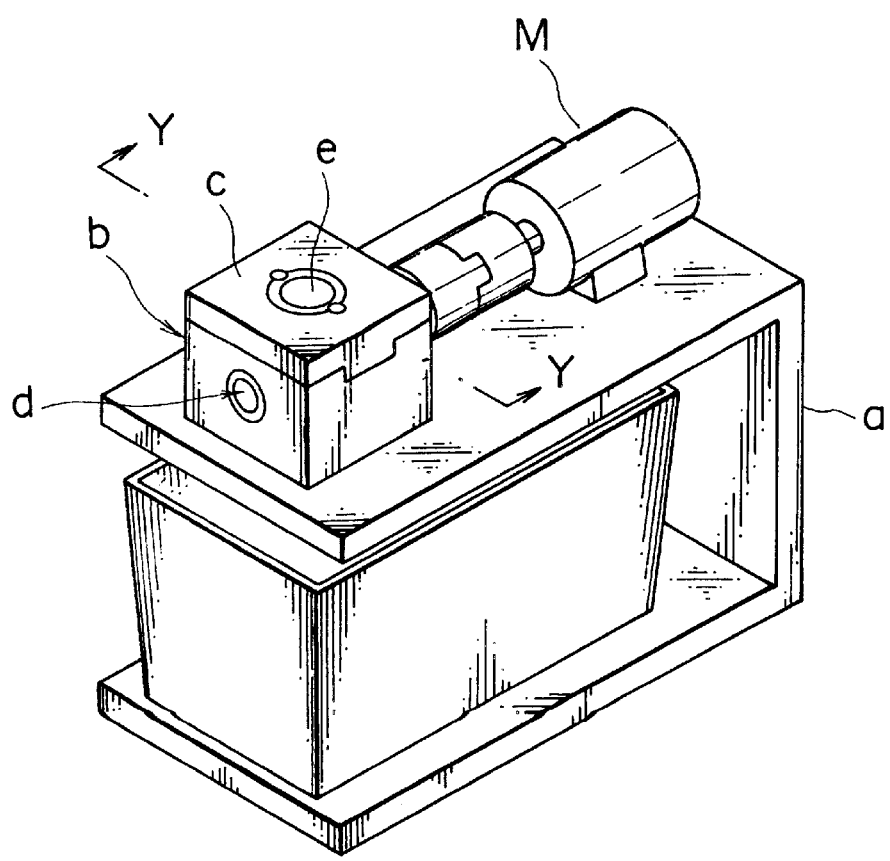
FIG. 9 is a perspective view showing a known wire cutting apparatus.
Figure 6B:
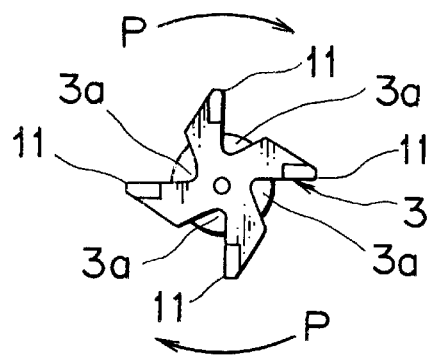
Figure 10:
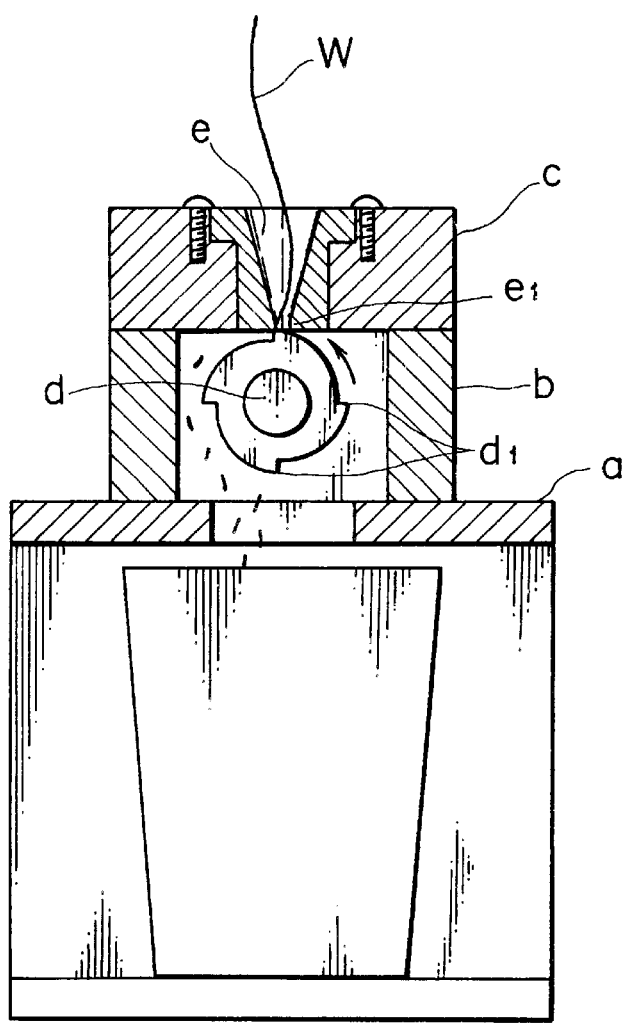
FIG. 10 is a sectional view taken on line Y—Y of FIG. 9.

Between the edges 11 of the rotary cutter 3, as shown in FIG. 6A, is formed a channel 3a at an angle α (about 12° in this embodiment) with the rotational shaft 8 of the rotary cutter 3. This, as illustrated in FIG. 6B, smoothly forwards short cut strips 13 of the wire W along the channel 3a in an arrow Q direction (see FIG. 6A) by the rotation of the rotary cutter in an arrow P direction (see FIG. 6B). Then, the short strips 13 fall to be received in a receiving box (not shown) located below the supporting frame 1.

In the absence of the channel 3a, the short cut strips 13 can not fall smoothly so that the strips accumulate around the edge 11 of the rotary cutter 3 where a viscous oil or the like is adhered to the wire. This may interrupt the wire cutting operation. Meanwhile, in the presence of the channel 3a, the short strips 13 are forwarded with less such interruption. The length of the short strips 13 can be selected by changing the rotational speed of the feed rollers 12, 12.

Figure 7A:
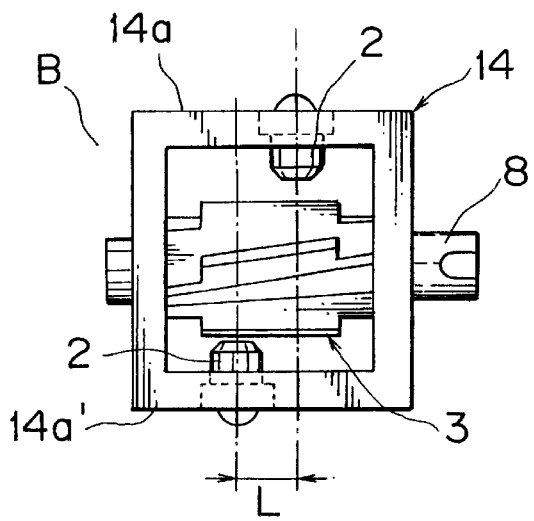
FIGS. 7A to 7C are views illustrating a wire cutting apparatus of another embodiment according to the present invention, FIG. 7A being a top view of the same, FIG. 7B the front view, and FIG. 7C a side view.
Figure 7B:
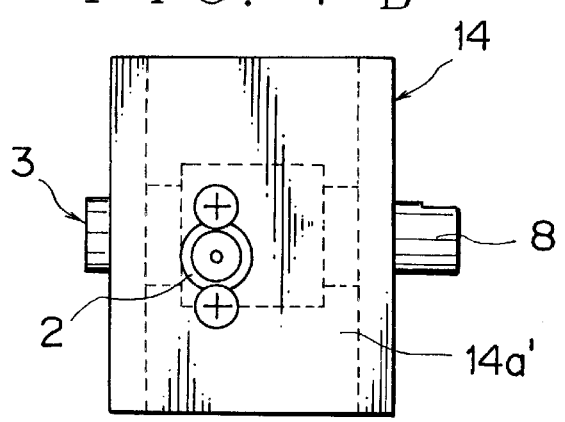
Figure 7C:
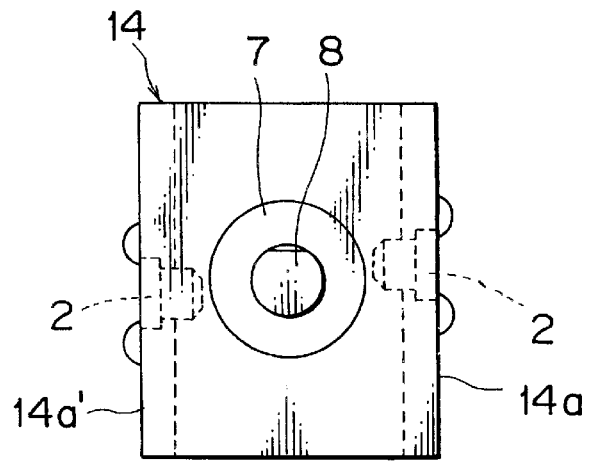

FIGS. 7A to 7C show a wire cutting apparatus B of another embodiment according to the present invention. FIG. 7A is a top view thereof, FIG. 7B the front view, and FIG. 7C a side view.

The wire cutting apparatus B has a supporting frame 14 that is manufactured in a body by extrusion molding of an aluminum alloy. In opposing side walls 14a, 14a' of the supporting frame 14 are respectively securely mounted a couple of fixed blades 2, 2. The fixed blade 2 affixed in the side wall 14a is shifted from the fixed blade 2 affixed in the side wall 14a' by a distance L, as illustrated in FIG. 7A. The central axes of the fixed blades 2, 2 are perpendicular to the rotational shaft 8 of the rotary cutter 3. The other structures are similar to those of the wire cutting apparatus A described in the first embodiment.

When one of the fixed blades 2 (in the side wall 14a) has worn off, the supporting frame 14 is turned by 180° so that the other fixed blade 2 (in the side wall 14a') is oriented toward the wire feeding side. Thus, the wire cutting apparatus B can replace the fixed blade 2 with ease. Moreover, this can advantageously make use of a new part of the edges 11 of the rotary cutter 3 because of the shift distance L.

Figure 8A:
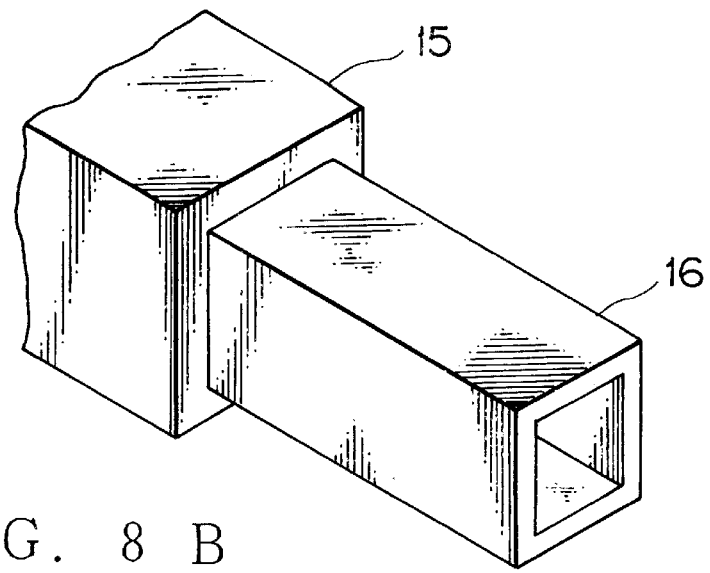
FIGS. 8A to 8C are explanatory views showing steps for manufacturing the supporting frame in FIG. 1, FIG. 8A showing a step of extruding a frame body from a metal mold, FIG. 8B a step of cutting the frame body at a predetermined length, FIG. 8C a step that the supporting frame has been formed with mounting holes.
Figure 8B:
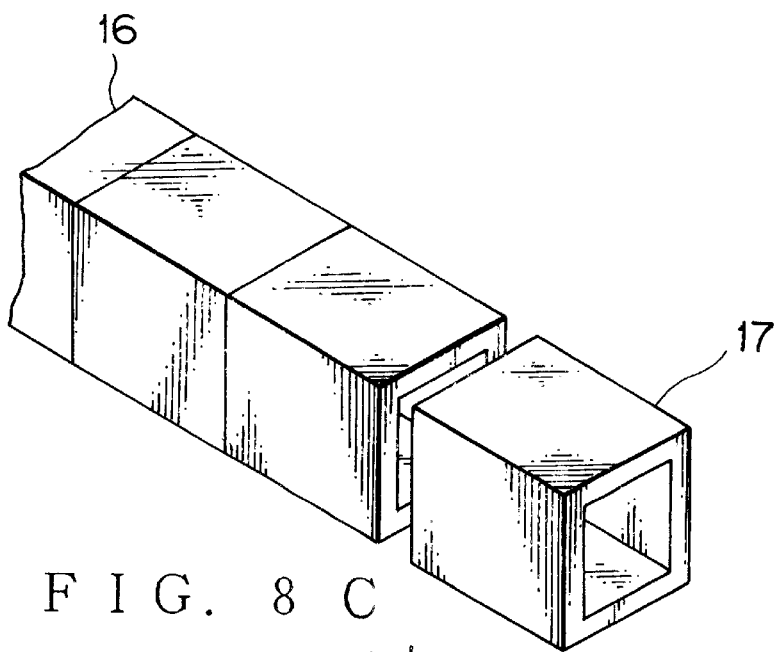
Figure 8C:
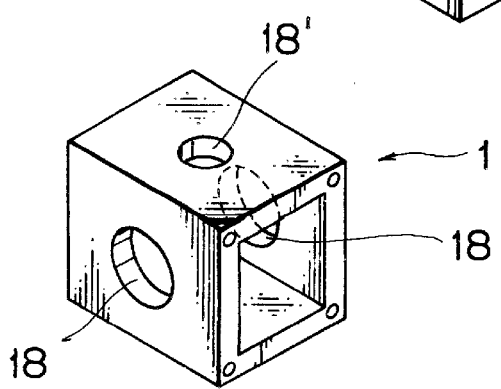

FIGS. 8A to 8C are perspective views showing steps of manufacturing the supporting frame 1 or 14 by extrusion molding of an aluminum alloy.

First, as shown in FIG. 8A, a frame body 16 made of an aluminum alloy is molded in a square cylinder shape by using a metal mold 15 for extrusion molding. Next, as shown in FIG. 8B, the frame body 16 is cut into a plurality of supporting frame base bodies 17 having a predetermined length. Then, as shown in FIG. 8C, the divided supporting frame base body 17 is formed with a couple of mounting holes 18 for mounting the rotary cutter 3, and a mounting hole 18' for the fixed blades 2. Thus, the supporting frame 1 is obtained.

These simplified manufacturing steps can advantageously accomplish the supporting frame that requires precision.

What is claimed is:

1. An apparatus for cutting a wire having a predetermined diameter, comprising:

a fixed blade having a wire feeding passage and a cutting edge provided at an inner open end of said wire feeding passage;

a rotary cutter having a plurality of cutting edges at a periphery thereof, and a supporting frame for mounting said fixed blade and said rotary cutter, wherein a rotational shaft of said rotary cutter is substantially perpendicular to an axis of said wire feeding passage, and a clearance larger than one third but not larger than one half the predetermined diameter of the wire is provided between a tip of said fixed blade and a tip of said rotary cutter, whereby the wire is pressed against said cutting edge of said fixed cutter by said cutting edge of said rotary cutter to be ripped off or torn off.

2. The apparatus as claimed in claimed in claim 1, wherein each of said cutting edges of said rotary cutter extends in a spiral around said rotational shaft.

3. The apparatus as claimed in claim 1, wherein said cutting edge of said fixed blade is formed at a periphery of a reduced diameter through-hole provided in a leading end of said wire feeding passage.

4. The apparatus as claimed in claim 1, wherein said rotary cutter has a channel provided between each couple of cutting edges of said rotary cutter and inclined to said rotational shaft.

5. The apparatus as claimed in claim 1, wherein said fixed blade is disposed in each of opposing side walls of said supporting frame so as to shift from each other in an axial direction of said rotational shaft.

6. The apparatus as claimed in claim 1, wherein said supporting frame is a frame molded in a body by metal extrusion molding.

7. The apparatus as claimed in claim 1, wherein said supporting frame is manufactured by cutting up a square cylindrical body formed by extrusion molding of an aluminum alloy.

8. The apparatus as claimed in claim 3, wherein said cutting edge of said fixed blade is formed at a whole circumferential periphery of said reduced diameter through-hole and said fixed blade is fixed to said supporting flame such that said fixed blade can be changed its fixing position in the circumferential direction of said cutting edge, whereby the whole periphery of said cutting edge can be used without replacement of said fixed blade.

* * * * *